US007453834B2

(12) United States Patent
Tapperson et al.

(10) Patent No.: US 7,453,834 B2
(45) Date of Patent: *Nov. 18, 2008

(54) DISTRIBUTED CONTROL SYSTEM FOR CONTROLLING MATERIAL FLOW HAVING WIRELESS TRANSCEIVER CONNECTED TO INDUSTRIAL PROCESS CONTROL FIELD DEVICE TO PROVIDE REDUNDANT WIRELESS ACCESS

(75) Inventors: Gary Tapperson, Austin, TX (US); Thomas A. Boyd, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 10/961,104

(22) Filed: Oct. 8, 2004

(65) Prior Publication Data

US 2005/0076151 A1  Apr. 7, 2005

Related U.S. Application Data

(63) Continuation of application No. 09/805,124, filed on Mar. 8, 2001, which is a continuation of application No. 08/864,750, filed on May 28, 1997, now Pat. No. 6,236,334, which is a continuation of application No. 08/782,513, filed on Jan. 9, 1997, now Pat. No. 5,682,476, which is a continuation of application No. 08/483,119, filed on Jun. 7, 1995, now abandoned, which is a continuation-in-part of application No. 08/328,324, filed on Oct. 24, 1994, now abandoned.

(51) Int. Cl.
*H04B 7/00* (2006.01)

(52) U.S. Cl. .................. 370/310; 370/225; 340/3.1; 340/825.23

(58) Field of Classification Search ................ 700/241, 700/244; 340/870.02, 825.37, 825.23, 3.1; 345/169; 701/123; 370/347, 338, 310, 225; 219/445.1
See application file for complete search history.

(56) References Cited

U.S. PATENT DOCUMENTS 4,149,237 A   4/1979   Freitas
(Continued)

FOREIGN PATENT DOCUMENTS

EP      0 491 657 A1      12/1991
(Continued)

OTHER PUBLICATIONS

Robert, "OLCHFA" A Distributed Time-Critical Fieldbus, IEE, UK, London, Digest No. 1993/189, Oct. 1993, pp. 6/1-6/3.
(Continued)

*Primary Examiner*—Le Luu
(74) *Attorney, Agent, or Firm*—Marshall, Gerstein & Borun LLP

(57) ABSTRACT

A wireless bridge device disposed within a process control system provides wireless communication between multiple devices within the process control system, such as between field devices, control units, user terminals, controllers, etc. In one embodiment, a process control system disposed within an industrial process environment includes a first process control device, a bridge device, a plurality of field devices disposed within the industrial process environment and a hardwired communication link disposed between the bridge device and each of the plurality of field devices. A wireless communication network including a first wireless transceiver located at the first process control device and a second wireless transceiver disposed at the bridge device enables the bridge device to operate to relay signals sent over the hardwired communication link from any of the plurality of field devices to the first process control device using the wireless communication network and to operate to relay signals sent over the wireless communication network from the first process control device to one or more of the plurality of field devices using the hardwired communication link.

21 Claims, 2 Drawing Sheets

U.S. PATENT DOCUMENTS

| | | | |
|---|---|---|---|
| 4,152,760 A | 5/1979 | Freitas et al. | |
| 4,268,822 A | 5/1981 | Olsen | |
| 4,303,973 A | 12/1981 | Williamson, Jr. et al. | |
| 4,517,637 A | 5/1985 | Cassell | |
| 4,539,655 A | 9/1985 | Trussell et al. | |
| 4,726,017 A | 2/1988 | Krum et al. | |
| 4,729,091 A | 3/1988 | Freeman et al. | |
| 4,910,658 A | 3/1990 | Dudash et al. | |
| 4,916,441 A | 4/1990 | Gombrich | |
| 4,949,299 A | 8/1990 | Pickett | |
| 5,088,021 A | 2/1992 | McLaughlin et al. | |
| 5,099,444 A | 3/1992 | Wilson et al. | |
| 5,131,019 A | 7/1992 | Sheffer et al. | |
| 5,142,550 A | 8/1992 | Tymes | |
| 5,150,363 A | 9/1992 | Mitchell | |
| 5,239,662 A | 8/1993 | Danielson et al. | |
| 5,252,967 A | 10/1993 | Brennan et al. | |
| 5,307,297 A | 4/1994 | Iguchi et al. | |
| 5,374,231 A | 12/1994 | Obrist | |
| 5,400,246 A | 3/1995 | Wilson et al. | |
| 5,400,253 A | 3/1995 | O'Connor | |
| 5,451,923 A | 9/1995 | Seberger et al. | |
| 5,493,569 A | 2/1996 | Buchholz et al. | |
| 5,495,482 A | 2/1996 | White et al. | |
| 5,495,484 A | 2/1996 | Self et al. | |
| 5,559,804 A | 9/1996 | Amada et al. | |
| 5,586,305 A * | 12/1996 | Eidson et al. | 703/11 |
| 5,612,890 A | 3/1997 | Strasser et al. | |
| 5,657,317 A | 8/1997 | Mahany et al. | |
| 5,664,005 A | 9/1997 | Emery et al. | |
| 5,666,530 A | 9/1997 | Clark et al. | |
| 5,682,476 A * | 10/1997 | Tapperson et al. | 370/225 |
| 6,043,461 A | 3/2000 | Holling et al. | |
| 6,129,449 A | 10/2000 | McCain et al. | |
| 6,236,334 B1 * | 5/2001 | Tapperson et al. | 340/825.37 |

FOREIGN PATENT DOCUMENTS

| | | |
|---|---|---|
| GB | 2 283 836 | 5/1995 |
| JP | 04-307608 | 10/1992 |
| JP | 1992-307608 | 10/1992 |
| JP | 05-252564 | 9/1993 |
| NZ | 216 109 | 8/1989 |
| NZ | 227 231 | 1/1991 |
| NZ | 239 534 | 11/1993 |

OTHER PUBLICATIONS

"The Fisher R0C364.", Fisher Controls International, Inc., 2 pages, Jul. 1996.

"FloBoss 500 Flow Manager", Fisher Controls International. Inc., 2 pages, Sep. 1996.

"The Fisher R0C306 and R0C312", Fisher Controls International, Inc., 2 pages, Jun. 1997.

"Cellular Digital Packet Data Reduces SCADA Costs", reprinted from The American Oil and Gas Reported, Aug. 1997, 4 pages.

Japanese Office action for Patent Application No. Hei 8-513089 dated Sep. 29, 2005.

* cited by examiner

DISTRIBUTED CONTROL SYSTEM FOR CONTROLLING MATERIAL FLOW HAVING WIRELESS TRANSCEIVER CONNECTED TO INDUSTRIAL PROCESS CONTROL FIELD DEVICE TO PROVIDE REDUNDANT WIRELESS ACCESS

CROSS REFERENCE TO RELATED APPLICATIONS

This application is a Continuation of pending U.S. application Ser. No. 09/805,124, filed Mar. 8, 2001 and entitled "Apparatus for Providing Redundant Wireless Access to Field Devices in a Distributed Control System" (which is hereby expressly incorporated by reference herein);

which is a Continuation of U.S. application Ser. No. 08/864,750, filed May 28, 1997, entitled "Distributed Control System for Controlling Material Flow Having Wireless Transceiver Connected to Industrial Process Control Field Device to Provide Redundant Wireless Access", which issued as U.S. Pat. No. 6,236,334 on May 22, 2001;

which is a Continuation of U.S. application Ser. No. 08/782,513, filed Jan. 9, 1997, entitled "Distributed Control System Having Central Control Providing Operating Power to Wireless Transceiver Connected to Industrial Process Control Field Device Which Providing Redundant Wireless Access", which issued as U.S. Pat. No. 5,682,476 on Oct. 28, 1997;

which is a Continuation of U.S. application Ser. No. 08/483,119, filed Jun. 7, 1995, and entitled "An Apparatus for Providing Redundant Wireless Access to Field Devices in a Distributed Control System", now abandoned;

which is a Continuation-in-Part of U.S. application Ser. No. 08/328,324, filed Oct. 24, 1994 and entitled "An Apparatus for Providing Non-Redundant Secondary Access to Field Devices in a Distributed Control System", now abandoned.

BACKGROUND

This invention relates to accessing field devices in a distributed control system. Specifically, this invention relates to providing redundant wireless access to such field devices remotely using wireless transceivers.

In a typical industrial plant, a distributed control system (DCS) is used to control many of the industrial processes performed at the plant. Typically, the plant has a centralized control room having a computer system with user I/O, disc I/O, and other peripherals as are known in the computing art. Coupled to the computing system is a controller and a process I/O subsystem.

The process I/O subsystem includes a plurality of I/O ports which are connected to various field devices throughout the plant. Field devices known in the control art include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. As used herein, the term "field device" encompasses these devices, as well as any other device that performs a function in a distributed control system and is known in the control art.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An HI Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is attracting attention in the industry.

As additional protocols and architecture gain popularity in the industry, the industry will face greater and greater challenges melding these technologies together into a single distributed control system. For example, newer devices will be coupled to an existing distributed control system. In these situations, the signals coming from the control room may expect traditional analog or hybrid technologies, but the field devices may be coupled to an H1 or H2 Fieldbus network. Conversely, the control room of the industrial plant may be renovated, with the inputs and outputs to the control room comprising a modem H1 or H2 field bus, and the individual signals running to some older analog and hybrid field devices, and newer Fieldbus based field devices.

In addition to the challenge of integrating various technologies into a single distributed control system, newer field devices will have maintenance modes and enhanced functions that are not accessible via an older control system. In addition, even when all components of a distributed control system adhere to the same standard (such as the Fieldbus standard), one manufacturer's control room equipment may not be able to access the secondary functions or secondary information provided by another manufacturer's field devices.

SUMMARY OF THE DISCLOSURE

The present invention provides an apparatus for providing wireless access to field devices in a distributed control system having a control room that, for example, provides hard-wired access to the field devices, thereby allowing access to the field devices in the event of a failure the hard-wired media.

In a first embodiment, each field device is provided with a wireless port and a hardwired port and can be accessed from a control room by a wireless handheld unit or a wireless terminal. In one configuration of this embodiment, the wireless port is powered by the control network to which the field device is connected.

In a second embodiment, a field module having a wireless port is connected to an existing control network. The field module provides access from a wireless handheld unit or a wireless terminal in the control room to all field devices connected to the control network. In one configuration of this embodiment, the field module is powered by the control network to which it is connected.

In a third embodiment, the distributed control system is provided with a bridge that connects a distribution network in the distributed control system to one or more control networks, wherein the control networks are coupled to field devices. The bridge also includes a wireless port that provides access from a wireless handheld unit or a wireless terminal in a control room to all field devices connected to the control networks.

In another embodiment, a wireless bridge device disposed within a process control system provides wireless communication between multiple devices within the process control system, such as between field devices, control units, user terminals, controllers, etc. In one case, a process control system disposed within an industrial process environment includes a first process control device, a bridge device, a plurality of field devices disposed within the industrial process environment and a hardwired communication link disposed between the bridge device and each of the plurality of field devices. A wireless communication network including a first wireless transceiver located at the first process control device and a second wireless transceiver disposed at the bridge device enables the bridge device to operate to relay signals sent over the hardwired communication link from any of the plurality of field devices to the first process control device using the wireless communication network and to operate to relay signals sent over the wireless communication network from the first process control device to one or more of the plurality of field devices using the hardwired communication link.

DETAILED DESCRIPTION OF PREFERRED EMBODIMENTS

Figure 1:
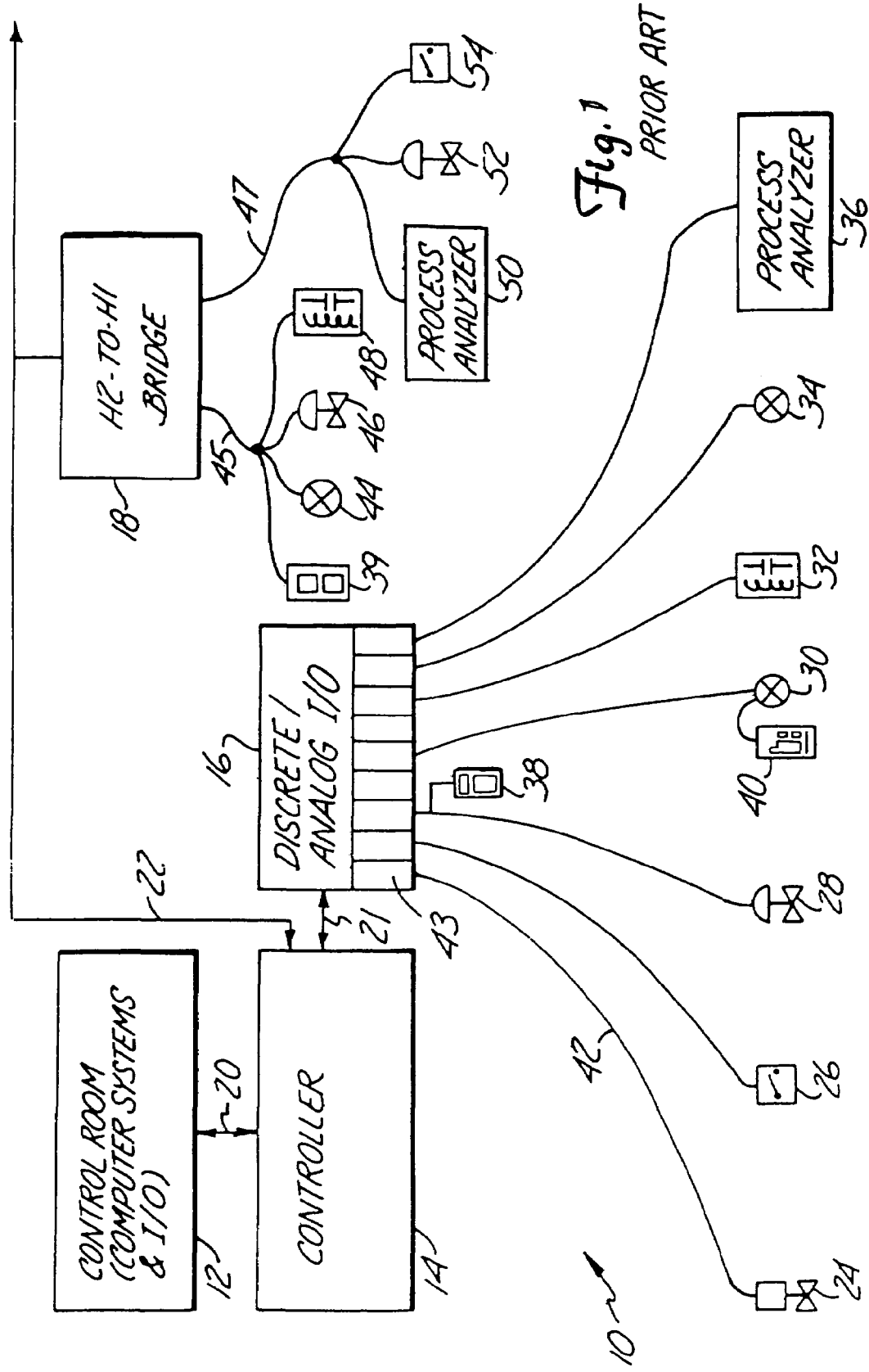
FIG. 1 is a diagram of a prior art distributed control system.

FIG. 1 is a block diagram of a prior art distributed control system (DCS) 10. DCS 10 is comprised of control room 12, controller 14, discrete/analog I/O unit 16, H2-to-H1 bridge 18, and a variety of field devices represented by solenoid 24, switches 26 and 54, valve positioners 28, 46, and 52, transmitters 30, 34, and 44, process analyzers 36 and 50. These devices represent any type of field device known in the control art. Also shown in FIG. 1 are handheld units 38 and 39, which are capable of accessing information in a hybrid or Fieldbus-based field device via a physical wire connection, and a local operator/user station 40, which is capable of communicating with field device 30 over a physical wire connection.

Control room 12 includes computers, user I/O, various forms of data storage devices, and other computing devices known in the art. Control room 12 is coupled to controller 14 via bus 20, which is typically a proprietary digital communications network or an open digital communication network employing a proprietary protocol. Controller 14 receives various commands from control room 12 and provides data to control room 12.

As depicted in FIG. 1, DCS 10 is a hybrid system comprising two different types of field devices. Devices 24-36 are traditional analog, discrete, and hybrid analog/digital devices, wherein the primary control function of the device is realized by modulating a current. These field devices are coupled to discrete/analog I/O unit 16, with each device connected to an individual channel of unit 16 by a single pair of wires (and possibly two additional power wires in the case of a traditional four-wire field device). For example, solenoid 24 is coupled via two-wire twisted pair 42 to channel 43 of unit 16.

For a traditional analog or discrete field device, the only communication with the device occurs by modulating or switching the current running through the two-wire twisted pair, with the magnitude of the current representing a measured process variable (as in the case of the transmitter), or an action requested by controller 14 (as in the case of a valve positioner or solenoid). Traditional analog devices have a frequency response limited to approximately 10 Hz and receive power from the two-wire twisted pair.

Hybrid analog/digital devices operate in a manner similar to traditional analog devices, but also allow digital communication of secondary information by superimposing a digital carrier signal on the modulated current carried by the two-wire twisted pair. One such hybrid analog digital system is known in the control art as Highway Addressable Remote Transducer (HART) and transmits data in a manner similar to a conventional computer modem adhering to the Bell 202 specification. Generally, the primary function of these devices is still realized by modulating the current through the loop, while other types of secondary information, such as diagnostic data, operating temperature, identification codes, error codes, and secondary variables, are transmitted digitally. In such a system, digital communication is relatively slow and is limited to approximately 300 baud. When a maintenance person desires to test an analog device, the maintenance person must make a physical connection to the device itself, such as local operator/user station 40 connected to transmitter 30, or to the two-wire twisted pair leading to the device, such as handheld unit 38 connected to the two-wire twisted pair leading to valve positioner 28.

In contrast, devices 44-54 are modem network-based digital field devices, wherein all information is digitally transmitted to and from each device. While many control system manufacturers have developed proprietary digital systems, the Standards and Practices Subcommittee 50 of the Instrument Society of America has developed and specified an architecture known in the art as Fieldbus. The Fieldbus specification includes two types of networks, a lower speed network referred to as H1 and a higher speed network referred to as H2. Both networks can support multiple connections to a single network bus, in contrast to traditional analog connections, which only support one device per two-wire twisted pair. While the present invention is described herein with reference to a Fieldbus network-based control system, in other embodiments the present invention may be employed in any distributed control system having network-based field devices.

A Fieldbus H2 network can transmit data at a rate up to 2.5 megabits per second. In addition, an H2 network includes two parallel sets of physical wire media: a primary wire media and a secondary, or redundant, wire media. Should the primary wire media fail, the secondary wire media is automatically used by the DCS. Because of the high capacity and redundancy of H2 Fieldbus networks, H2 Fieldbus networks are beginning to be used as a distribution network that connect the controller to various distribution units in the DCS. However, traditional distribution networks are proprietary networks using either parallel or serial communication.

In FIG. 1, H2 distribution network 22 couples controller 14 to H2-to-H1 bridge 18, and proprietary bus 21 couples controller 14 to discrete/analog I/O unit 16. In other configurations known in the art, unit 16 and bridge 18 may be coupled to a common distribution network. As previously discussed, discrete/analog I/O unit 16 includes discrete channels, with each channel coupled to a single device.

H2-to-H1 bridge links the data carried by proprietary distribution network 22 to H1 Fieldbus control networks 45 and 47. H1 Fieldbus control network 45 is coupled to transmitters 44, valve positioner 46, and relay 48, and H1 Fieldbus 47 is coupled to process analyzer 50, valve positioner 52, and solenoid 54. While an HI Fieldbus network lacks redundant wiring, and has a lower data transmission rate of approximately 31.25 kilobits per second, it is capable of providing power to the devices to which it is coupled, while an H2 Fieldbus network does not. For the above reasons, the H1 Fieldbus network is ideal for providing final connections to individual field devices, while the H2 Fieldbus network is ideal for distributing control signals throughout the physical plant controlled by the DCS.

More recently, field devices have been provided with microprocessors and additional functionality. Such "smart" field devices are capable of monitoring a plurality of process variables, performing a variety of control functions, performing comprehensive diagnostics, and providing a wide array of various types of status information. The Fieldbus specification specifies a variety of primary functions that may be supported by various Fieldbus field devices. In addition, many manufacturers have provided secondary functions beyond those specified in the Fieldbus specification. While Fieldbus field devices manufactured by different manufacturers are compatible to the extent that only Fieldbus specified functions are accessed, they are not compatible with respect to the secondary functions. For example, a Fieldbus controller manufactured by company A will generally not be able to access the secondary functions provided by a Fieldbus valve positioner manufactured by company B. Therefore, an industrial plant using a variety of Fieldbus components provided by different manufacturers will not be able to use of all the functions provided by the various components.

The problem is worse in older distributed control systems that were designed to use traditional analog/discrete and hybrid devices. Often a company will wish to preserve an investment in an existing installation, and will retrofit the installation with newer Fieldbus field devices. In such an installation, the control room will not even be able to access the standardized Fieldbus functions provided by the various devices. Accordingly, a need exists to access the secondary functions provided by various manufacturers, as well as standardized Fieldbus functions when a Fieldbus based device is connected to an older distributed control system.

The present invention is an apparatus and method for providing redundant wireless access to field devices in a distributed control system, thereby allowing access to field devices in the event of a failure of the hard-wired media that connects the field devices to a control room. The redundant wireless access can be used several ways. First, it can be used to allow continued operation of a distributed control system during failure or maintenance of the hard-wired media. However, even if continued operation is not desired, redundant wireless access may still be valuable for monitoring process variables and performing control actions, such as those required to shut down a process. For example, consider a distributed control system subjected to an explosion. The explosion, may render the hardwired media connecting field devices to the control room inoperable. Using the redundant wireless access provided by the present invention, a control room operator will still be able to access field device to perform an orderly shut-down of the distributed control system. The operator may observe critical temperatures and pressures, and adjust or close valves and other devices to complete the shut down. By having redundant wireless access to the field devices, the operator may be able to effect a shutdown in such a way as to minimize losses.

Figure 2:
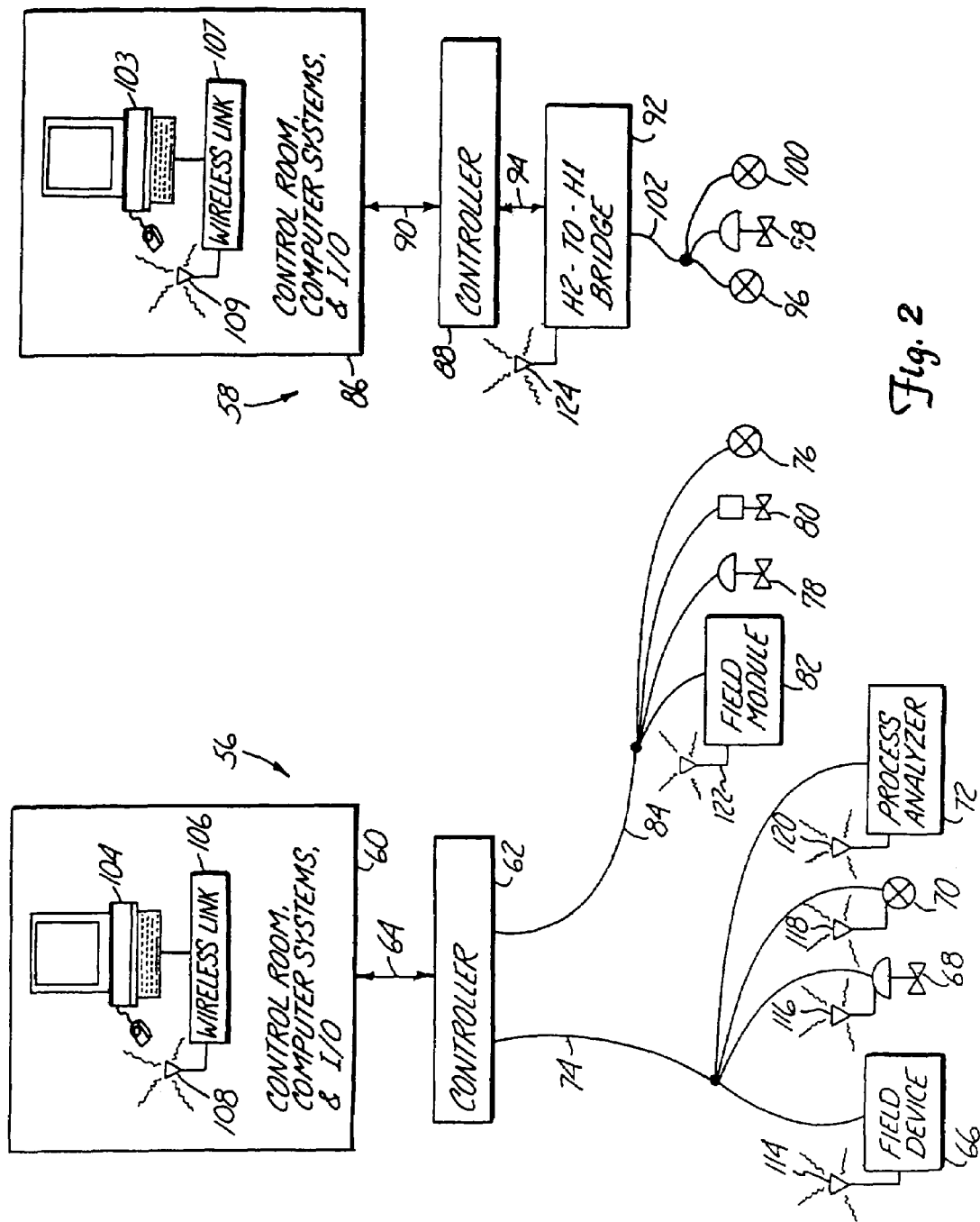
FIG. 2 is a diagram of industrial plant having two distributed control systems and shows three embodiments of the present invention.

FIG. 2 is a diagram of an industrial plant having two distributed control systems. DCS 56 is comprised of control room 60 (which includes terminal 104 coupled to wireless link module 106, which in turn is connected to wireless transceiver 108), controller 62, bus 64, field device 66, valve positioner 68, transmitter 70, process analyzer 72, H1 Fieldbus control network 74, transmitter 76, valve positioner 78, solenoid 80, field module 82, and H1 Fieldbus control network 84. DCS 58 is comprised of control room 86 (which includes terminal 103 coupled to wireless link module 107, which in turn is connected to wireless transceiver 109), controller 88, bus 90, H2 Fieldbus distribution network 94, H2-to-H1 bridge 92, transmitters 96 and 100, valve positioner 98, and H1 Fieldbus control network 102. Buses 64 and 90 are normally proprietary digital communication networks, or open communication networks employing a proprietary protocol.

Two embodiments of the present invention are illustrated in DCS 56. The first embodiment is illustrated by those field devices coupled to H1 Fieldbus control network 74. Each field device on control network 74 includes a wireless transceiver. Field device 66 represents any generic field device coupled to control network 74 and includes wireless transceiver 114. Valve positioner 68 includes wireless transceiver 116, transmitter 70 includes wireless transceiver 118, and process analyzer 72 includes wireless transceiver 120. Each wireless transceiver implements a redundant wireless Fieldbus connection with terminal 104, thereby allowing redundant wireless access to each field device from control room 60.

Another novel feature of the present invention is that the wireless Fieldbus port attached to each field device is powered by the hardwired H1 Fieldbus port attached to each device. Since the wireless Fieldbus link of the field devices is powered by the existing H1 Fieldbus control network, no additional wiring is required.

The wireless links disclosed herein represent any wireless communication method known in the art, including, but not limited to, radio, infrared, visible light, and ultrasonic forms of wireless communication.

A second embodiment of the present invention is illustrated by the devices connected to H1 Fieldbus control network 84. Transmitter 76, valve positioner 78, and solenoid 80 are each coupled to control network 84. Also coupled to control network 84 is field module 82, which includes a wireless transceiver 122 powered by H1 Fieldbus control network 84. Field module 82, in essence, forms a wireless bridge between control network 84 and terminal 104 in control room 56, and allows terminal 104 to access each device coupled to H1 Fieldbus control network 84. Accordingly, field module 82 is ideally suited for providing redundant wireless access in an existing environment having a variety of H1 Fieldbus devices from different manufacturers.

A third embodiment of the present invention is illustrated by DCS 58. In DCS 58, controller 88 is coupled to H2-to-H1 bridge by H2 Fieldbus distribution network 94. H2-to-H1 bridge links H2 Fieldbus distribution network 94 to H1 Fieldbus control network 102. H2-to-H1 bridge also includes a second Fieldbus port connected to wireless transceiver 124, and communicates with a remote device such as terminal 103. Accordingly, terminal 103 in control room 86 can access all field devices serviced by the H2-to-H1 bridge, such as transmitters 96 and 100 and valve positioner 98. In other configurations, it is common for an H2-to-H1 bridge to service a plurality of H1 Fieldbus control networks, in which case all field devices connected to all control networks serviced by the H2-to-H1 bridge can be accessed remotely.

The present invention provides wireless redundant access to field devices in a distributed control system having a control room that provides hardwired access to the field devices. In a modem distributed control system having Fieldbus devices coupled to a Fieldbus control room, the present invention provides a redundant wireless access to a terminal having a wireless link. The apparatus of the present invention allows access to field devices in the event of failure or other unavailability of the hard-wired media that couples the control room to field devices.

In one embodiment, each Fieldbus-based device is provided with its own secondary wireless H1 or H2 Fieldbus port that is powered by the H1 Fieldbus control network. This embodiment provides maximum flexibility because no modification of the distributed control system is required, and is ideally suited for new devices that are to be added to an existing Fieldbus installation. As soon as the H1 Fieldbus device is connected to the existing H1 Fieldbus control network, the device can be accessed via the wireless terminal.

In another embodiment of the invention, a field module is connected to an existing Fieldbus control network. The field module has a wireless H1 or H2 Fieldbus port that is powered by the H1 Fieldbus control network, and provides access from the wireless terminal to all Fieldbus devices connected to the control network. This embodiment is ideally suited for distributed control systems that already have Fieldbus devices.

In yet another embodiment of the present invention, the distributed control system is provided with an H2-to-H1 bridge having one or more H1 control networks coupled to Fieldbus devices, a hard-wired H2 port coupled to a controller, and a wireless H2 or H1 Fieldbus port. The wireless Fieldbus port allows a wireless terminal to access all Fieldbus devices on all H1 control networks serviced by the H2-to-H1 bridge.

Although the present invention has been described with reference to preferred embodiments, workers skilled in the art will recognize that changes may be made in form and detail without departing from the spirit and scope of the invention.

What is claimed is:

1. A process control system disposed within an industrial process environment, comprising:
    a first process control device communicatively coupled to a process controller via a hardwired communication connection;
    a bridge device;
    a plurality of field devices disposed within the industrial process environment and under control of the process controller, wherein each of the plurality of field devices measures one or more physical process parameters of the industrial process environment or performs a physical action within the industrial process environment to affect one or more physical process parameters of the industrial process environment;
    a hardwired communication link disposed between the bridge device and each of the plurality of field devices; and
    a wireless communication network including a first wireless transceiver located at the first process control device and a second wireless transceiver disposed at the bridge device,
    wherein the bridge device operates to relay signals sent over the hardwired communication link from of the plurality of field devices to the first process control device using the wireless communication network and operates to relay signals sent over the wireless communication network from the first process control device to one or more of the plurality of field devices using the hardwired communication link.

2. The process control system of claim 1, wherein the first process control device is a user terminal and the bridge device is an input/output device coupled to the process controller.

3. The process control system of claim 1, wherein the first process control device is a user terminal and the bridge device is a further field device.

4. The process control system of claim 1, wherein the hardwired communication link is a bus-type communication link.

5. The process control system of claim 4, wherein the hardwired communication link is a fieldbus protocol bus.

6. The process control system of claim 1, wherein the hardwired communication link is a HART protocol communication link.

7. The process control system of claim 1, wherein the first process control device is located within a centralized control room of a distributed process control system, and the plurality of field devices are located outside of the centralized control room of the distributed process control system.

8. The process control system of claim 1, wherein further including a second hardwired communication link disposed between the bridge device and the first process control device.

9. The process control system of claim 1, wherein the first control device comprises an input/output device.

10. A method of providing communications within a process control system disposed within an industrial process environment, comprising:
    placing a first wireless transceiver at a first process control device;
    communicatively coupling the first process control device to a process controller via a hardwired communication connection;
    placing a second wireless transceiver at a bridge device;
    communicatively connecting a plurality of field devices disposed within the industrial process environment via a hardwired communication link to the bridge device, wherein each of the plurality of field devices is under control of the process controller and operates to measure one or more physical process parameters of the industrial process environment or to perform a physical action within the industrial process environment to affect one or more physical process parameters of the industrial process environment; and
    operating the bridge device to relay signals sent over the hardwired communication link from the plurality of field devices to the first process control device using the first and second wireless transceivers and operating the bridge device to relay signals sent via the first and second wireless transceivers from the first process control device to one or more of the plurality of field devices using the hardwired communication link.

11. The method of providing communications within a process control system of claim 10, wherein placing a first wireless transceiver at the first process control device includes placing the first wireless transceiver at a user terminal.

12. The method of providing communications within a process control system of claim 11, wherein placing a first wireless transceiver at a user terminal includes placing the first wireless transceiver at a user terminal in a centralized control room.

13. The method of providing communications within a process control system of claim 10, wherein placing a second wireless transceiver at the bridge device includes placing the second wireless transceiver at an input/output device associated with a the process controller.

14. The method of providing communications within a process control system of claim 10, wherein placing a second wireless transceiver at the bridge device includes placing the second wireless transceiver at a field device.

15. The method of providing communications within a process control system of claim 10, wherein communicatively connecting a plurality of field devices disposed within the industrial process environment via a hardwired communication link to the bridge device includes using a hardwired communication link that uses a bus protocol.

16. The method of providing communications within a process control system of claim 10, wherein communicatively connecting a plurality of field devices disposed within the industrial process environment via a hardwired communication link to the bridge device includes using a hardwired communication link that uses a HART communication protocol.

17. The method of providing communications within a process control system of claim 10, further including communicatively connecting the bridge device to the first process control device with a second hardwired communication link.

18. The method of claim 10, wherein placing the first wireless transceiver at the first process control device comprises placing the first wireless transceiver at a process control device comprising an input/output device.

19. A communication network within a process control system having a first control device, a process controller and a plurality of field devices, wherein each of the plurality of field devices is under control of the process controller and operates to measure one or more physical process parameters of the industrial process environment or to perform a physical action within the industrial process environment to affect one or more physical process parameters of the industrial process environment, comprising:
    a first wireless transceiver located at the first control device within the process control system;
    a plurality of second wireless transceivers, wherein each second wireless transceiver is located at one of the plurality of field devices; and
    a hardwired communication connection between the first control device and the process controller;
    wherein the first and second wireless transceivers communicate wirelessly to rely relay signals communicated from the process controller to the first process control device over the hardwired communication connection to one or more of the plurality of field devices and to relay signals from one or more of the plurality of field devices to the process controller via the first process control device and the hardwired communication connection between the first process control device and the process controller.

20. The communication network of claim 19, wherein the first control device is a user terminal.

21. The communication network of claim 19, wherein the first control device comprises an input/output device.

* * * * *

UNITED STATES PATENT AND TRADEMARK OFFICE
CERTIFICATE OF CORRECTION

PATENT NO. : 7,453,834 B2 Page 1 of 1
APPLICATION NO. : 10/961104
DATED : November 18, 2008
INVENTOR(S) : Gary Tapperson et al.

It is certified that error appears in the above-identified patent and that said Letters Patent is hereby corrected as shown below:

<u>In the Claims:</u>

At Column 10, line 3, "a the" should be -- the --.

At Column 10, line 46, "rely relay signals" should be -- relay signals --.

Signed and Sealed this

Thirtieth Day of June, 2009

JOHN DOLL
*Acting Director of the United States Patent and Trademark Office*